United States Patent Office 3,328,957
Patented July 4, 1967

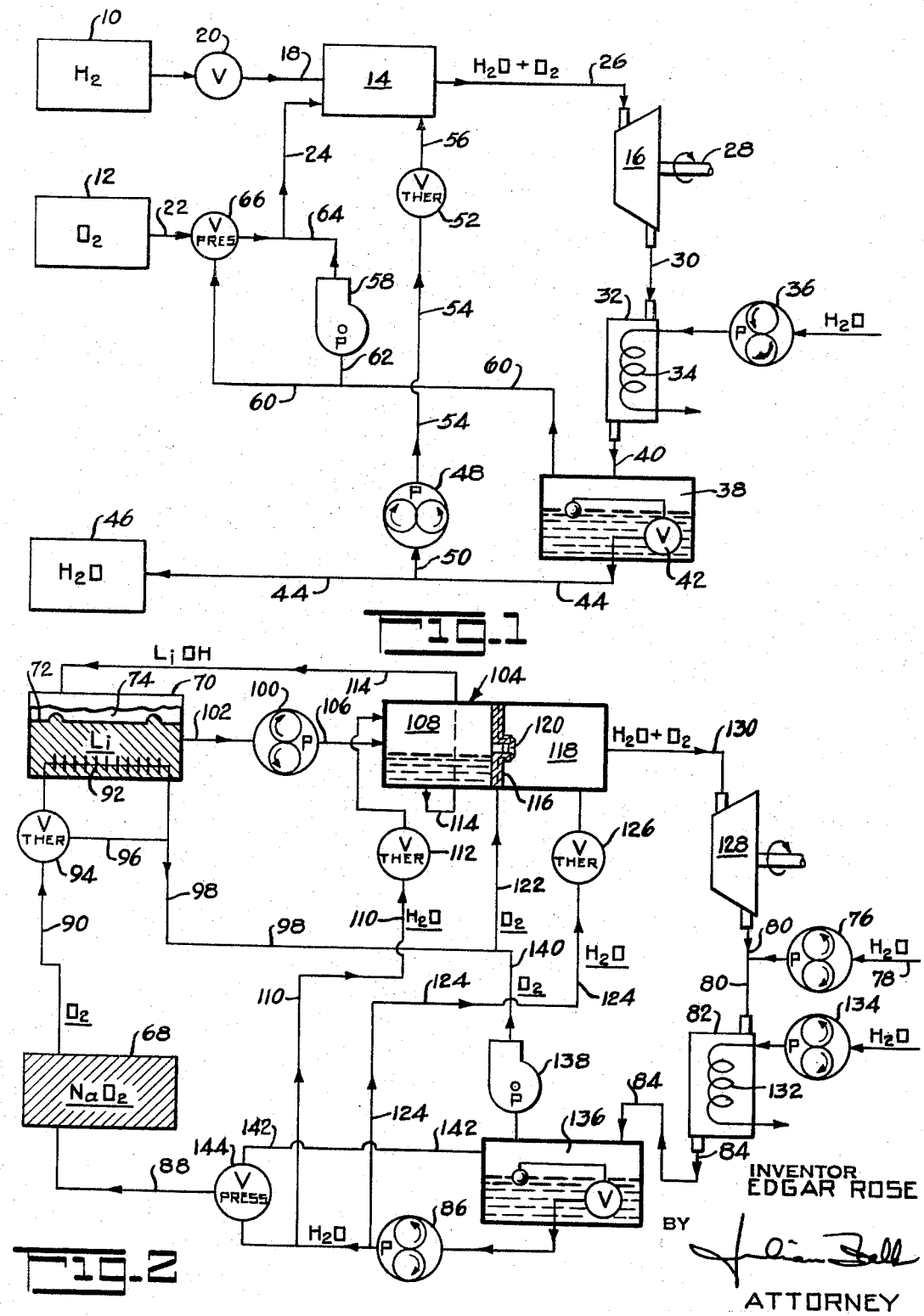

3,328,957
RATIO CONTROL FOR CLOSED CYCLE PROPULSION SYSTEMS
Edgar Rose, Teaneck, N.J., assignor to Curtiss-Wright Corporation, a corporation of Delaware
Filed Jan. 3, 1966, Ser. No. 518,357
6 Claims. (Cl. 60—39.46)

This invention relates to underwater, depth insensitive propulsion systems and in particular to flow ratio controls for a chemical reaction propulsion system.

The present invention is particularly adaptable to deep submersible vehicles such as torpedoes, submarines, or the like, which make use of a closed cycle propulsion system. Closed cycle propulsion systems for deep submersible vehicles are particularly advantageous in that they are depth insensitive. As is well known, the greater the depth of operation in water, the greater the pressures, which makes the use of open cycle systems impractical because the exhaust products must be expelled into the surrounding environment wherein the outside pressure affects the exhaust emission and the horsepower output of the propulsion system. However, in a closed cycle propulsion system, the exhaust products are not exhausted to the outer environment but are continuously re-cycled through and/or stored in the system, thus making this type of system insensitive to the depth of operation.

The non-nuclear type depth insensitive propulsion systems commonly in use today are mostly of the battery-electric motor system type. These systems are heavy, expensive and of limited range. The chemical reaction closed cycle system is considered an improvement over the battery-electric motor system since it does not require the use of heavy batteries with their inherent disadvantages. In the chemical reaction closed cycle system it is important to control the composition of the combustion products in order to maintain a proper balance of the reactants and thus control the chemical reaction. Further, in a system which is intended to be operated unattended, the control must be automatic and reliable. The system of the present invention provides for a simple flow rate ratio control which is automatic and reliable and operates without complicated instrumentation and uses only conventional components.

The invention is generally carried out by providing an engine including a combustion chamber which operates on a fuel and oxidizer to drive a turbine or the like. Means are provided for measuring the pressure of at least one of the products of combustion for operating a control which in one execution automatically adjusts the flow rate of the oxidizer relative to the flow rate of the fuel in such a manner that the average flow rate ratio of the fuel and oxidizer is maintained exactly stoichiometric. At the same time it permits the reaction between the fuel and oxidizer to take place at a fuel-oxidizer ratio most conducive to high combustion efficiency.

Accordingly, it is one object of the invention to provide a novel and improved closed cycle, depth insensitive propulsion system for submersible vehicles or the like.

It is another object of the invention to provide a novel and improved flow rate control for the reactants in a closed cycle chemical reaction propulsion system.

It is still a further object of the invention to provide a novel and improved fuel-oxidizer flow rate ratio control for a closed cycle propulsion system which control is simple in construction and operates automatically and reliably.

Other objects and advantages of the invention will be best understood upon reading the following detailed description with the accompanying drawings in which:

FIG. 1 is a schematic representation of one embodiment of the invention; and

FIG. 2 is a schematic representation of a second embodiment of the invention.

Referring to FIG. 1, there is shown therein a closed cycle propulsion system which is adapted for use in a submersible vehicle such as a swimmer vehicle, torpedo, or the like. The propulsion system of the invention is of the closed cycle type including a combustion phase and thus the fuel used in the combustion process must be provided with its own oxygen source for supporting combustion and in the embodiment shown in FIG. 1, the fuel is carried in a storage tank 10, which is represented as hydrogen in this case, and the oxidizer is carried in a storage tank 12. An engine for producing propulsion is provided, which engine includes a combustion chamber 14 and an expander 16 such as a gas turbine or the like. The hydrogen in the tank 10 is stored under pressure and is connected to the combustion chamber 14 through a fuel line 18 in which there is provided a power control valve 20 for regulating the flow of hydrogen to the combustion chamber and thus power output of the engine. The power control valve 20 may be regulated by any suitable means or may be preset for a specific power level output for the engine. For example, control valve 20 may be operated by a computer or the like or manually by the vehicle operator. The oxidizer from the tank 12 is supplied to the combustion chamber 14 through a line 22 and line 24. The line 22 has a pressure actuated valve connected thereto for regulating the flow of oxygen in a manner which will be described in greater detail below. Initiation of the flow of fuel and oxidizer may be carried out through any suitable means and forms no part of the present invention. Such means are well known in use with rocket engines or the like.

As the hydrogen and oxygen flow into the combustion chamber, they may be initially ignited by a spark plug, glow plug, catalyst, or the like, and thereafter the temperature of the reaction itself will be sufficient to support combustion of the newly fed hydrogen and oxygen. As is well known, in the combsution process between hydrogen and oxygen, two molecules of hydrogen combine with each molecule of oxygen to produce one molecule of water with heat being rejected during the combustion process. Due to the intense heat of combustion the water produced as a product of combustion is generally in the form of steam which is in a superheated condition. The superheated steam may be passed into an expansion turbine 16 or the like wherein the thermal energy of the superheated steam is converted into mechanical energy in the conventional manner. For example, the turbine shaft may drive a propeller and/or be used in the generation of electrical power.

In order to insure maximum combustion efficiency or substantially complete combustion of all the hydrogen introduced into the combustion chamber 14, an excess of oxygen is introduced in the combustion chamber so that there will be sufficient oxygen available to combine with substantially all of the hydrogen in all parts of the combustion chamber. As is well known, due to the swirling of the fuel in the combustion chamber, variations in pressures in the combustion chamber and other conditions affecting the mixture of the oxygen and hydrogen, the oxygen will not mix with all of the hydrogen at the exact stoichiometric point if only sufficient oxygen is introduced which would be in accordance with the exact stoichiometric ratio. It is therefore desirable to provide an excess of oxygen to insure full combination with all of the hydrogen but only in sufficient amounts so as not to hinder the combustion of the hydrogen by providing too lean a mixture. Thus, the ratio of the supply of oxygen to hydrogen is not exactly at the stoichiometric point for reaction of the oxygen with hydrogen but is at a fuel-oxygen ratio most conducive to high combustion efficiency.

The exhaust products from the combustion of the hydrogen and oxygen will therefore not only include water in the form of superheated steam but will also include some of the excess oxygen not combined with the hydrogen in the combustion process. The superheated steam and oxygen are fed from the combustion chamber 14 into the expansion turbine 16 through a line 26 or by direct connection of the combustion chamber and turbine in a known manner. The superheated steam and excess oxygen will be expanded in the turbine 16 with the expansion thereof driving the turbine 16 and its output shaft 28, which shaft 28 may drive a propeller (not shown) or the like for propelling the vehicle containing the propulsion system. It should be understood that the expansion engine may take a form other than a turbine such as, for example, a rotary piston expansion engine of the Wankel type disclosed in U.S. Patent No. 2,988,065, issued on June 13, 1961.

The expanded steam and excess oxygen are discharged from the turbine 16 to a line 30 and into a condenser 32. Water is pumped through a coil 34 in the condenser 32 from a suitable source, such as the exterior of the vehicle, by a suitable pump 36 which may be connected to the output shaft 28 in a known manner for driving said pump 36. The relatively cold water supplied by the pump 36 serves to condense the expanded steam from the turbine 16 into water which water is then delivered to a trap or reservoir 38 through a line 40. The reservoir 38 is provided with a float valve 42 which opens to permit the water in said reservoir 38 to flow through a line 44 into a storage tank 46 when the water level in said reservoir 38 reaches a predetermined level. A pump 48 is connected to the water line 44 through an input line 50 and into a thermostatic valve 52 through an output line 54. The thermostatic valve 52 serves to control the flow of water from the pump 48 to a line 56 leading to the combustion chamber 14. The water supplied by the pump 48 serves to cool the combustion chamber 14 and the thermostatic valve 52 controls the flow of water to said combustion chamber 14 in accordance with a desired temperature to be maintained for the walls of the combustion chamber and the steam emerging from the combustion chamber.

The excess oxygen after passing through the condenser 32 into the reservoir 38 will be separated from the water in said reservoir and may collect above the water level where it is drawn off by a compressor 58, suitably connected to the output shaft 28 for driving said compressor 58, through a line 60 connected between the reservoir 38 and a line 62 connecting the line 60 to the compressor 58. The compressor 58 compresses the excess oxygen drawn from the reservoir 38 and supplies the compressed oxygen to an output line 64 and a line 24 for recirculating the oxygen into the combustion chamber 14.

As further illustrated in FIG. 1, the excess oxygen pressure line 60 is also connected to one side of a pressure actuated valve 66 provided in the oxygen line 22. The pressure valve 66 may be of any well-known type which is responsive to a pressure signal for regulating the flow through the valve in accordance with said pressure signal. For example, pressure valve 66 may be a bellows-type valve having the excess oxygen connected to one side of the bellows and a regulator valve member connected to the other side thereof. The specific form of the valve 66 itself forms no part of the present invention.

It will be seen that the oxygen from the reservoir 38 is not only circulated by means of the compressor 58 to the combustion chamber 14, but is also used to provide a pressure signal to the pressure actuated valve 66 for controlling the main flow of oxygen into the line 22 into said combustion chamber 14. If at any time, the flow of oxygen from the line 22 is greater than the amount used up in the hydrogen combustion process, the accumulation of excess oxygen will result in an increase in the oxygen pressure in the exhaust system of the expander 16. This increase in pressure will be sensed by the pressure actuated valve 66 which valve then cuts down on the main flow of oxygen. Conversely, if the main flow of oxygen is less than that required stoichiometrically by the hydrogen combustion process, the pressure actuated valve 66 will increase the flow of oxygen to the line 22 into the line 24 and the combustion chamber 14.

Thus, the invention provides a control which in one execution will automatically adjust the flow rate of the oxidizer to the flow rate of the fuel or hydrogen in such a manner that the average flow rate ratio of the fuel and oxidizer is maintained exactly stoichiometric. At the same time, it permits the reaction between the fuel and oxidizer to take place off the stoichiometric point, at a fuel-oxidizer ratio most conducive to high combustion efficiency. It will be further apparent that, if there is an excessive build-up of pressure in the exhaust system, the valve 66 will automatically shut down the power plant by preventing the flow of the oxidizer and thus prevent any damage to the propulsion system. It should be also understood that instead of controlling the flow of oxidizer through the feed-back system, the invention may also be carried out by controlling the flow of the fuel in a similar manner.

Referring to FIG. 2, there is shown therein another embodiment of the invention wherein the fuel and oxidizer are generated within the system itself. A storage tank 68 is provided which contains sodium superoxide, $NaO_2$, and a tank 70 is provided which, for example, contains solid lithium metal. As seen in FIG. 2, the lithium does not entirely fill the tank 70 and a bladder 72 is provided within the tank 70 to separate the lithium from the space 74 in the upper portion of the tank 70. As in the case of FIG. 1, the propulsion system shown in FIG. 2 is intended to be embodied in a depth insensitive vehicle used for movement through or under water. A pump 76 is connected to a suitable source of water, such as that surrounding the exterior of the vehicle, through a line 78 for pumping water to a line 80 through a condenser 82 and into a line 84. A pump 86 is provided downstream of the condenser 82 to supply water to the tank 68 through a line 88. The water supplied to the tank 68 reacts with the sodium superoxide to produce sodium hydroxide, $NaOH$, and oxygen, $O_2$, plus a substantial amount of heat. The sodium hydroxide produced in the reaction is in a liquid state and remains in the tank 68 while the oxygen is bled off through a line 90 into a heat exchanger 92 disposed in the lithium tank 70. The temperature of the oxygen produced in the hydrolysis of the sodium superoxide is substantially in excess of the melting point of lithium which is 357° F. and a thermostatic valve 94 is placed in the line 90 which serves to bypass the heat exchanger 92 after the lithium temperature has been raised to a temperature within the range of 100° to 200° F. above the melting point of the lithium. The thermostatic valve 92 will bypass the oxygen into a line 96 for supply to a line 98 to be used in a manner which will be explained hereinafter. The thermal control action of the valve 94 has for its prime purpose to prevent the lithium temperature from exceeding the thermal limits of the lithium pump 100 used to pump the molten lithium from the tank 70.

The pump 100 is connected to the lithium tank 70 through a line 102 and to the first section 108 of a double section combustion chamber 104 through a line 106. Thus, it will be seen that molten lithium is supplied by the pump 100 to the first section 108 of the combustion chamber 104. Water is supplied to the combustion chamber section 108 from the pump 86 and line 110 connected to the line 88 with a thermostatic valve 112 being interposed in the line 110 which controls a supply of water which is sprayed into the combustion chamber section 108 in accordance with the reaction temperature inside the combustion chamber section 108. Thus, the thermostatic valve 112 will serve to maintain a desired ratio of water to molten lithium supplied to the combustion section 108. The lithium and water supplied to said combustion chamber section 108 react to produce lithium hydroxide, LiOH, steam and hydrogen, $H_2$, at a desired chamber pressure in the range of, for example, 500 to 1000 p.s.i.a. The lithium hydroxide produced in the reaction is in a molten state and can be returned to the lithium storage tank as it settles to the bottom of the combustion chamber section 108 wherein gravity force will pump the molten lithium hydroxide out of the bottom of said chamber into a line 114 connected between the bottom of said section 108 and the space 74 in the lithium storage tank 70. The bladder 72 in said tank 70 serves to separate the lithium hydroxide from the lithium in the tank 70. The lithium storage tank 70 is preferably made somewhat larger than that required for storing the lithium itself because of the greater volume required for storing the lithium hydroxide. Also, a pump may be provided in the line 114 to aid in purging chamber 108 of the lithium hydroxide. The combustion chamber 104 including its first section 108 may be supported so that it will be gravity insensitive in order that the molten lithium hydroxide will always settle to the bottom of the chamber. For example, the combustion chamber body 104 may be gimballed or supported in a manner such as the storage tank shown in United States Patent No. 2,662,538, issued on December 15, 1953.

The combustion chamber 104 is separated by a partition or ring member 116 which divides said combustion chamber into the first section 108 and a second combustion chamber section 118. Ring member 116 is provided with an opening or orifice which permits the hydrogen and steam produced in the hydrolysis of the lithium in chamber section 108 to pass into the second chamber section 118. It is also within the scope of the invention to separate the combustion chamber sections 108 and 118 and/or provide a separate pump for supplying the hydrogen and steam to the combustion chamber section 118. Oxygen, which is produced in the hydrolysis of the sodium superoxide in the tank 68, is supplied to the line 98 either in the circuit containing the heat exchanger 92 or the bypass loop 96 to a line 122 which connects to suitable injectors or to passageways in the ring member 116 so that the oxygen from the line 122 will also be supplied to the second combustion chamber section 118. As in the case of the embodiment of FIG. 1, the hydrogen and oxygen in the chamber section 118 will react and combustion will take place to produce high pressure superheated steam and an excess of oxygen. The oxygen is supplied to the chamber in substantially the same ratio as that in the embodiment of FIG. 1 so that there will be an excess of the oxygen in the exhaust products produced as a result of the combustion reaction. Water is supplied for cooling the chamber section 118 through a line 124 with a thermostatic valve 126 controlling the supply of the cooling water to maintain a desired temperature level. Preferably the chamber temperature in the chamber section 118 is maintained at a level of approximately 1800° F. at a pressure of approximately 500 to 1000 p.s.i.a.

The superheated steam and oxygen are discharged from the combustion section 118 to an expansion engine such as a gas turbine shown at 128 through a discharge line 130 wherein the energy from the gases is converted into shaft power in the turbine to drive suitable propellers or the like for propelling the vehicle. After the superheated steam is expanded in the turbine 128, it is discharged therefrom into the line 80 wherein it is fed into the condenser 82. A condensing coil 132 is provided in the condenser which may be provided with cold water by a suitable pump 134 connected to a source of cold water such as that surrounding the exterior of the vehicle. The condensed water is fed from the condenser 82 through a line 84 into a trap 136 wherein the water will settle to the bottom of the trap and the oxygen will separate to the top level. The excess oxygen may be drawn off by a suitable compressor 138 and supplied through a line 140 back into the combustion chamber 118 through the line 122. The pump 86 may be connected to the trap 136 for pumping the condensed water back into the system for re-use therein.

As in the case of the embodiment described in FIG. 1, the excess oxygen is utilized as a feed-back control for the oxygen generator so that the supply of oxygen to the combustion chamber section 118 is kept within the stoichiometric range. In the embodiment of FIG. 2, a line 142 is connected to the trap 136 for bleeding off oxygen therefrom, which is the excess oxygen produced as an exhaust product from the turbine 128. The line 142 is connected to one side of a pressure regulator valve 144 which is disposed in the water line 88, whose function is to supply water to the sodium superoxide tank 68 for generating oxygen. The pressure valve 144 may be of the same type described in relation to FIG. 1, that is, a diaphragm or bellows-type valve which in response to oxygen pressure in the line 142 will vary the supply of water through the line 88 to the tank 68. Thus, if a significant amount of oxygen is exhausted from the turbine 128 and collected in the trap 136, the pressure in the line 142 will increase to the valve 144 and the valve 144 will react to decrease the supply of water to the sodium superoxide tank 68 and thus decrease the generation of oxygen. The oxygen supplied to the combustion chamber 118 will be made up by the excess oxygen supplied from the trap 136 and compressor 138. Thus, it will be seen that the function of the feed-back control in the embodiment of FIG. 2 is substantially the same as that in the embodiment of FIG. 1 and provides a control which automatically adjusts the flow rate of oxygen in proportion to the flow rate of hydrogen in such a manner that the average flow rate ratio of the hydrogen and oxygen is maintained within the stoichiometric range.

While the invention has been described in detail in its preferred embodiments, it will be obvious to those skilled in the art that various changes and modifications may be made without departing from the spirit and scope thereof. It is intended to cover such modifications in the appended claims.

I claim:

1. A control means for a closed cycle powerplant system including a source of at least two propellants, engine means including combustion means for burning said propellants and expansion means for converting the energy produced during combustion into shaft power with the products of combustion including a relatively high pressure vapor and an excess of one of said propellants, condensor means for condensing said vapor after exhaustion from said expansion means, and means for recirculating said excess of said one of said propellants to said combustion means for supporting combustion therein, said control means comprising; flow control means for regulating the flow of said propellants from said source of said propellants to said combustion means, said flow control means including means responsive to the pressure of said excess of said one of said propellants after exhaustion from said expansion means for varying the flow of at least one of said propellants from said source of propellants in response to changes in the pressure of said excess of said one of said propellants such that the ratio of said propellants supplied to said combustion means is maintained within the stoichiometric range for said propellants.

2. A control means for a closed cycle powerplant system as recited in claim 1 wherein said means responsive to the pressure of said excess of said one of said propellants includes valve means with said valve means being operably connected to said means for recirculating said excess of said one of said propellants to said combustion means and to said source of at least one of said propellants such that in response to changes in the pressure of said excess of said one of said propellants said valve means will vary the flow of said one propellant from said source to said combustion means.

3. A control means for a closed cycle powerplant system as recited in claim 2 wherein one of said propellants comprises an oxidizer for supporting combustion in said combustion means and said valve means is operably connected between said source of said oxidizer and said combustion means for regulating the flow of said oxidizer to said combustion means in accordance with the pressure of said excess of said one of said propellants.

4. A control system for a closed cycle powerplant system as recited in claim 3 wherein said excess of said one of said propellants comprises said oxidizer.

5. A control system for a closed cycle powerplant system as recited in claim 4 wherein the other of said propellants comprises hydrogen.

6. A control system for a closed cycle powerplant system as recited in claim 1 wherein said source of propellants includes an oxidizer generating means for supplying an oxidizer to said combustion means with said oxidizer generating means including a water reactive chemical and means for supplying water to said oxidizer generating means, said means responsive to the pressure of said excess of said one of said propellants including valve means operably connected to said oxidizer generating means and said means for recirculating said excess of said one of said propellants to said combustion means, and said valve means being operative for regulating the supply of water to said oxidizer generating means in response to changes in the pressure of said excess of said one of said propellants for controlling the supply of oxidizer to said combustion means from said oxidizer generating means.

References Cited

UNITED STATES PATENTS 3,101,592  8/1963  Robertson _____ 60—39.05

MARK NEWMAN, *Primary Examiner.*

D. HART, *Assistant Examiner.*